United States Patent [19]

Molloy

[11] Patent Number: 4,521,919

[45] Date of Patent: Jun. 4, 1985

[54] BATHROOM RADIO

[76] Inventor: Lawrence Molloy, 12 Welwyn Rd. Apt. 1G, Great Neck, N.Y. 11021

[21] Appl. No.: 527,782

[22] Filed: Aug. 30, 1983

[51] Int. Cl.³ ............................................. H04B 1/08
[52] U.S. Cl. .................................... 455/344; 4/300; 4/483; 4/661; 116/67 R; 455/347
[58] Field of Search ...................... 455/344, 347, 351; 4/483, 661, 300, 406, 408, 213; 116/67 R; 200/61.62, 61.81

[56] References Cited

U.S. PATENT DOCUMENTS 1,927,453  9/1933  Hill ...................................... 455/347
3,900,908  8/1975  Stump ................................... 4/213

FOREIGN PATENT DOCUMENTS 46651  4/1977  Japan ...................................... 4/661

*Primary Examiner*—Marc E. Bookbinder
*Attorney, Agent, or Firm*—Michael I. Kroll

[57] ABSTRACT

A bathroom radio is provided and consists of a housing in the shape of an animal such as a duck to hold a radio circuit within, a pair of suction cup legs, for securing the housing in a place between a toilet tank and a toilet seat cover and a pressure sensitive switch in the flexible bill of an adjustable head of the housing electrically connected to the radio circuit so that when the toilet seat cover is lifted up the cover will press against the pressure sensitive switch to close the radio circuit and when the toilet seat cover is placed back down the pressure sensitive switch will open turning the radio circuit off.

4 Claims, 3 Drawing Figures

U.S. Patent   Jun. 4, 1985   4,521,919
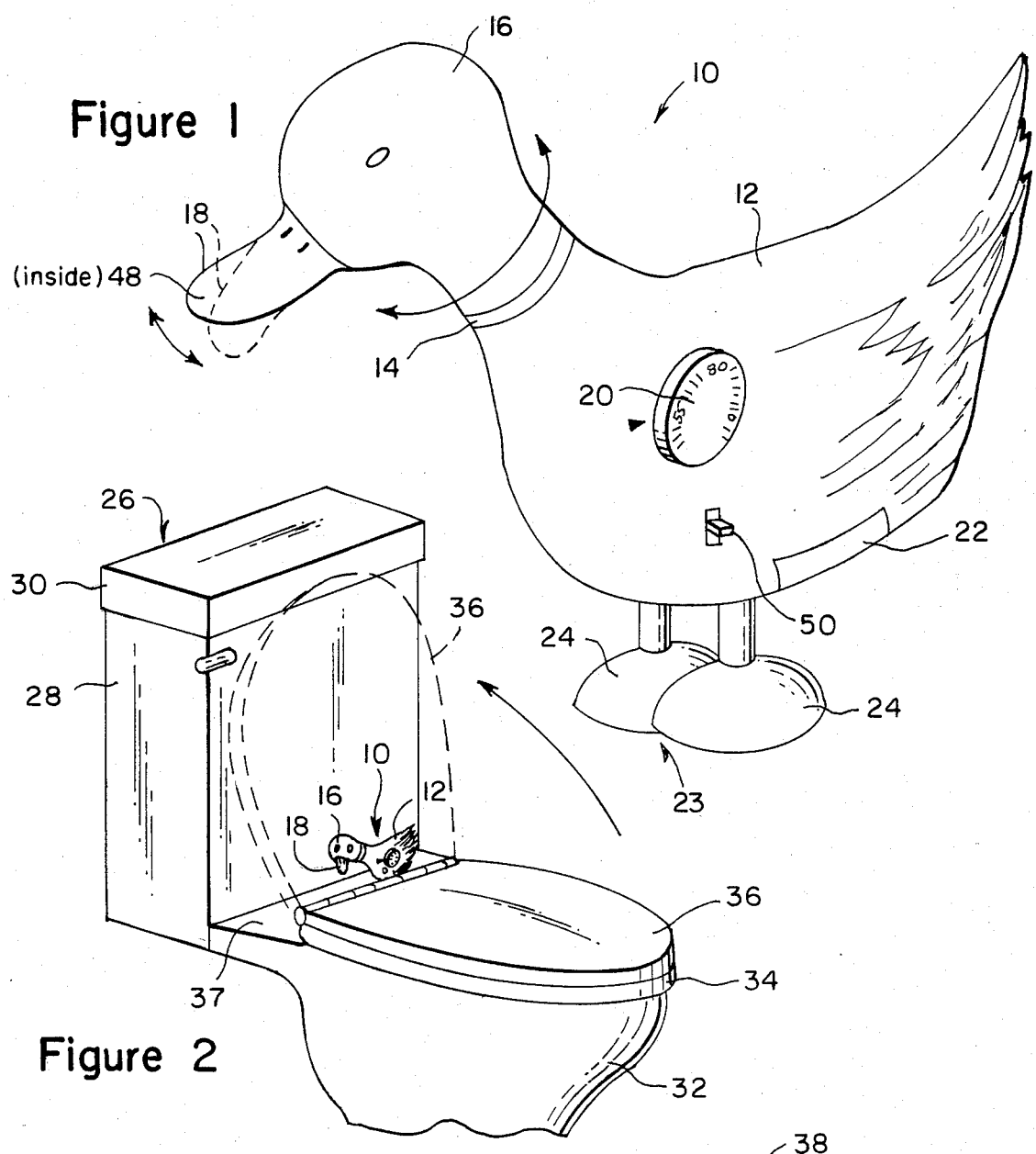
Figure 1
Figure 2
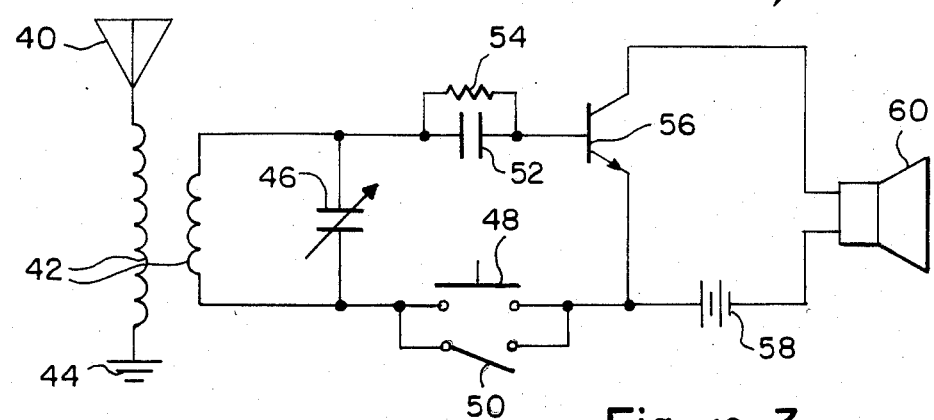
Figure 3

BATHROOM RADIO

BACKGROUND OF THE INVENTION

1. Field of Invention

The instant invention relates generally to radios and more specifically it relates to a bathroom radio that is activated by the toilet seat cover.

2. Description of the Prior Art

Numerous radios have been provided in prior art that are adapted to receive radio broadcasts. While these units may be suitable for the particular purpose to which they address, they would not be suitable for the purposes of the present invention as heretofore described.

Often times it is desirable to cover-up typical bathroom noises and the instant invention fills this requirement.

SUMMARY OF THE INVENTION

A principle object of the present invention is to provide a bathroom radio that is activated by a toilet seat cover.

Another object is to provide a bathroom radio that is in the form of an animal.

An additional object is to provide a bathroom radio that can be secured in a space between a toilet tank and a toilet seat cover.

A further object is to provide a bathroom radio that is simple and easy to use.

A still further object is to provide a bathroom radio that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention.

FIG. 2 is a perspective view of the invention placed onto a toilet ready for use.

FIG. 3 is an electrical diagram of a typical radio circuit used with the invention.

DETAILED DESCRIPTION OF THE PREFERRED EMBODIMENTS

Turning now descriptively to the drawings, in which similar reference characters denote similar elements throughout the several views, FIGS. 1 through 3 illustrates a bathroom radio 10 that consists of a radio circuit 38, a housing 12, a device 23 for securing the housing 12 in a place 37 between a toilet tank 28 having a tank lid 30 and a toilet seat cover 36 on a bowl 32 of a toilet 26 and a pressure sensitive switch 48.

The housing 12 is to hold the radio circuit 38 within. The pressure sensitive switch 48 is electrically connected to the radio circuit 38 so that when the toilet seat cover 36 is lifted up the cover 36 will press against the pressure sensitive switch 48 to close the radio circuit 38. When the toilet seat cover 36 is placed back down onto a toilet seat 34 the pressure sensitive switch 48 will open turning the radio circuit 48 off.

The bathroom radio 10 further contains a tuner dial 20 and a battery compartment 22. The tuner dial 20 is to change the radio stations while the battery compartment 22 is to store a battery 58 so that the housing 12 can be opened to remove and replace the battery 58 when needed.

The housing 12 is in the form of an animal whereby the pressure sensitive switch 48 is located within a head 16 of the animal. The head 16 is adjustable by a flexible ring 14 so that the pressure sensitive switch 48 can be best positioned to make contact with the toilet seat cover 36. The animal housing 12 is shown as a duck but any animal configuration can be used. The pressure sensitive switch 48 is located within a flexible duck bill 18 in the head 16.

The device 23 for securing the housing 12 in the place 37 between the toilet tank 28 and the toilet seat cover 36 consists of a pair of suction cups 24. Each suction cup 24 being one leg of the animal housing 12 to the place 37 between the toilet tank 28 and the toilet seat cover 36.

The radio circuit as shown in FIG. 3 is a typical radio circuit 38 and contains an aerial 40, an antenna coupler transformer 42, a ground 44, a tuner variable capacitor 46, a pressure sensitive switch 48, an override switch 50, a fixed capacitor 52, a resistor 54, a transistor 56, a battery 58 and a speaker 60. The radio circuit 38 is well known in the art. The unique feature is the pressure sensitive switch 48 and the override switch 50. The override switch 50 will bypass the pressure sensitive switch 48 to manually turn the radio circuit 38 on and off. Other radio circuits can be used in conjunction with the pressure sensitive switch 48 and the override switch 50.

To use the bathroom radio 10 a person will press the suction cups 24 in the place 37 between the toilet tank 28 and the toilet seat cover 36. The head 16 will be adjusted so that the pressure sensitive switch 48 in the duck bill 18 will make contact with the toilet seat cover 36 when its in the up position. The tuner dial 20 can be set to any radio station desired. When the person comes into the bathroom to use the toilet 26 the toilet seat cover 36 will be lifted up making contact with the pressure sensitive switch 48 that will turn the radio circuit 38 on.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A bathroom radio which comprises:
   (a) a radio circuit;
   (b) a housing to hold said radio circuit within in the form of an animal having a head;
   (c) means for securing said housing in a place between a toilet tank and a toilet seat cover;
   (d) a pressure sensitive switch located within the head of said animal electrically connected to said radio circuit so that when the toilet seat is lifted up the cover will press against said pressure sensitive switch to close said radio circuit and when the toilet seat cover is placed back down said pressure sensitive switch will open turning said radio circuit off (e) a tuner to change the radio stations;
(f) a battery compartment to store a battery so that said housing can be opened to remove and replace said battery when needed; and
(g) a flexible ring contained in said head of said animal so that said pressure sensitive switch can be positioned to make contact with said seat cover.

2. A bathroom radio as recited in claim 1, wherein said animal housing is in the form of a duck and said pressure sensitive switch is located within a flexible duck bill in the head.

3. A bathroom radio as recited in claim 2, wherein said means for securing said housing in a place between a toilet tank and a toilet seat cover comprises a pair of suction cups, each of said suction cups being one leg of said animal housing to engage the place between the toilet tank and the toilet seat cover.

4. A bathroom radio as recited in claim 3, wherein said radio circuit further comprises an override switch to bypass the pressure sensitive switch to manually turn said radio circuit on and off.

* * * * *